April 2, 1929. W. G. EXTON 1,707,717
INSTRUMENT FOR MEASURING FLUIDS FOR TURBIDITY, COLOR, ETC
Filed Aug. 16, 1927 3 Sheets-Sheet 1
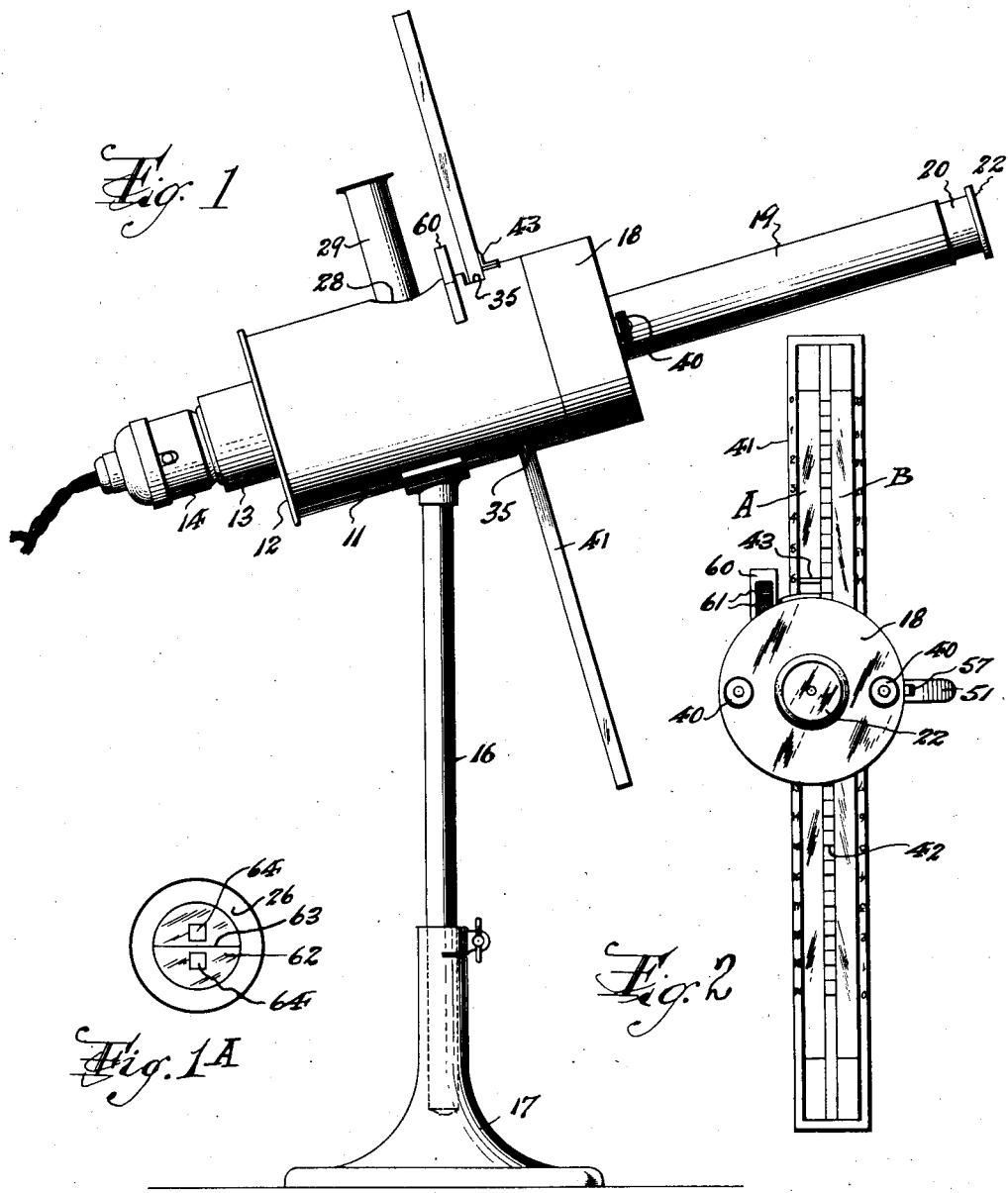
INVENTOR.
William G. Exton,
BY
George D. Richards,
ATTORNEY.

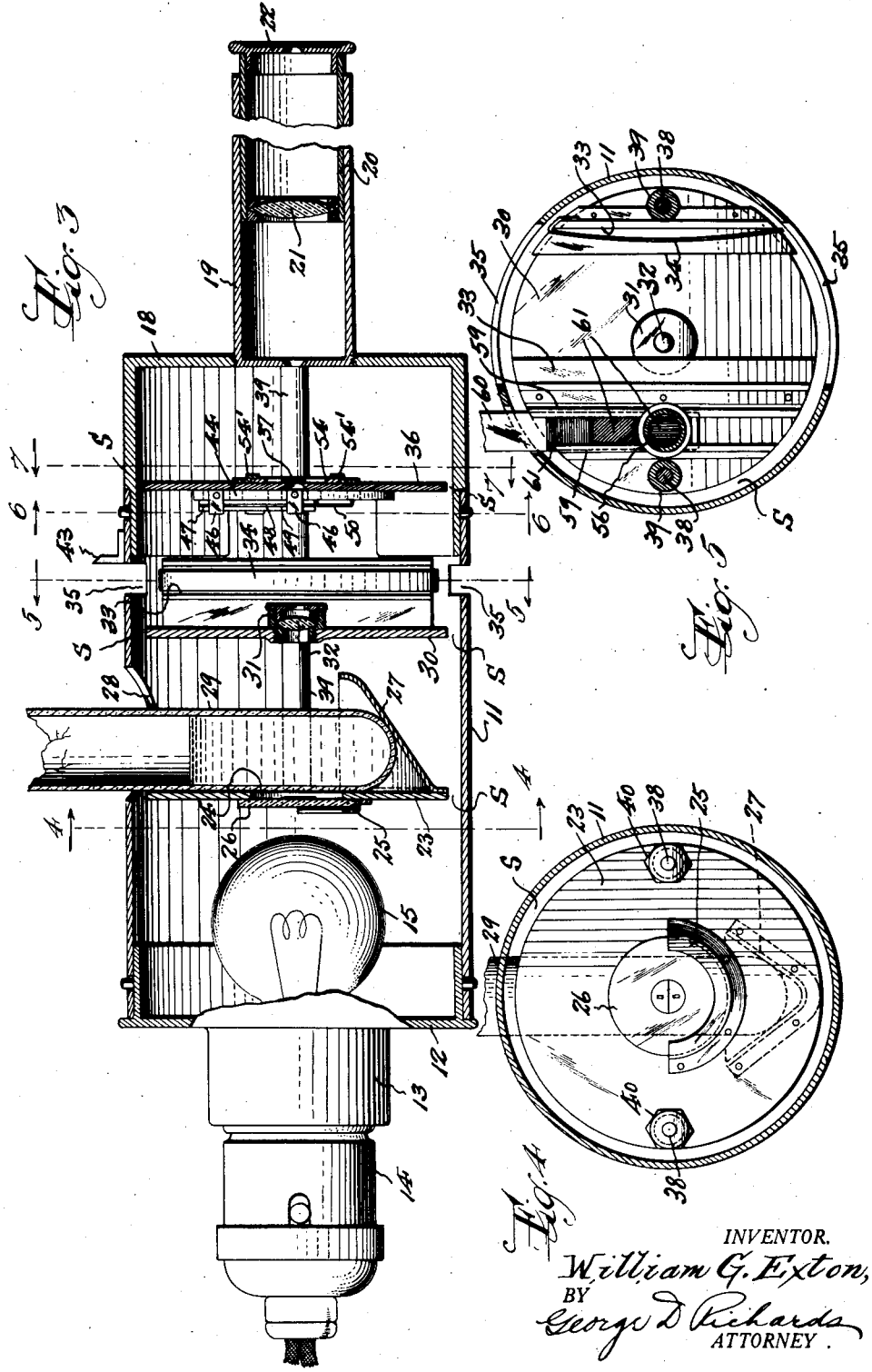

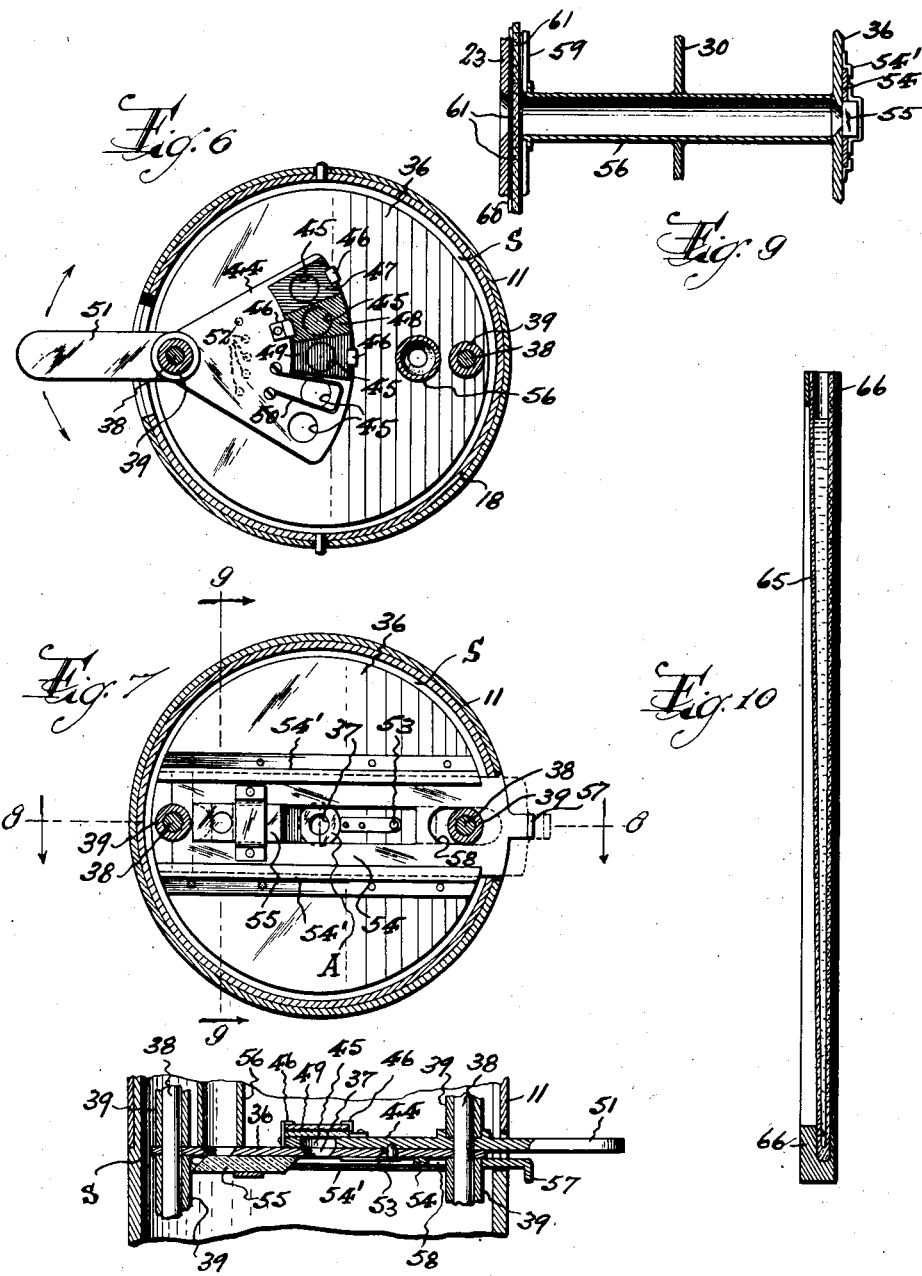

Patented Apr. 2, 1929.

1,707,717

UNITED STATES PATENT OFFICE.

WILLIAM G. EXTON, OF NEW YORK, N. Y.

INSTRUMENT FOR MEASURING FLUIDS FOR TURBIDITY, COLOR, ETC.

Application filed August 16, 1927. Serial No. 213,275.

This invention relates generally, to an instrument for measuring turbidities, colors and other characteristics of fluids by optical observation.

The present invention has for its principal object to provide an improved form and comparatively inexpensive construction of instrument of the general type and kind shown in my copending application for United States Letters Patent Serial No. 64,364, filed October 23rd, 1925.

In the instrument of the instant invention, I have provided means whereby extinction index criteria are obtained by means of an illuminated target and extinction wedges of either turbid characteristics (i. e. adapted to scatter light transmitted therethrough while nevertheless obscuring an image of an illuminated target mark) or absorptive characteristics (i. e. adapted to absorb all transmitted light when obscuring the image of an illuminated target mark), the respective types of wedges being selectively used at will; and cooperative with said extinction criteria means the instrument is further provided with means whereby an adaptation field is produced in juxtaposition with or surrounding the field of observation, so that the extinction of target mark does not occur in darkness but in surrounding light which adapts the eye of the observer to see the vanishing point more critically and comfortably. In addition to provision for use of extinction criteria by the selective wedge and target means, the instrument of the present invention is also provided with a novel means for interposing desired color filters across the field of observation; and the instrument is further provided with a simple and effective means for selectively furnishing photometric criteria by means of a comparison field in juxtaposition to the field of observation.

The invention therefore has for its objects to provide a simple, and relatively inexpensive instrument of improved mechanical construction and arrangement whereby several optical methods of examination by using extinction index criteria and photometric criteria, which have been heretofore disclosed by me in copending applications for United States Patents, viz, Serial No. 570,459, filed June 23, 1922, Serial No. 644,602, filed June 11, 1923, Serial No 64,634, filed October 23, 1925, and Serial No. 177,819, filed March 23, 1927, may be employed, and thus enabling the operator to make a plurality of measurements by different optical methods, which measurements may be correlated to obtain both quantitative and qualitative analyses of a fluid under examination Other objects of this invention, not at this time more particularly enumerated, will be understood from the following detailed description of the same.

The present invention is clearly illustrated in the accompanying drawings in which:—

Figure 1 is a side elevation of the novel measuring instrument made according to and embodying the principles of this invention: Figure 1^A is a face view of one form of target element suitable for use in the instrument; Figure 2 is an end elevation of the same; Figure 3 is a longitudinal sectional view of the same, drawn on an enlarged scale; Figure 4 is a cross section on line 4—4 of Figure 3; Figure 5 is a cross section on line 5—5 in Figure 3; Figure 6 is a cross section on line 6—6 in Figure 3; Figure 7 is a cross section on line 7—7 in Figure 3; Figure 8 is a fragmentary horizontal section on line 8—8 in Figure 7; Figure 9 is a fragmentary detail vertical section on line 9—9 in Figure 7; and Figure 10 is a longitudinal sectional view of a modified testing wedge adapted to receive a fluid to be measured.

Similar characters of reference are employed in all of the hereinabove described views to indicate corresponding parts.

Referring now to said drawings, the reference character 11 indicates a longitudinal casing, preferably of cylindrical form, the same being closed at its rearward end by a rear cap 12 preferably detachably connected therewith. Said rear cap 12 is provided with a central rearwardly projecting neck 13 of reduced diameter, in which is suitably secured a socket connection 14 to receive at its interior end an electric lamp 15 serving to provide desired illumination for testing or measuring operations when using the instrument. Connected with the underside of said casing 11, so as to extend downwardly therefrom, is a standard 16, the lower end of which is adjustably secured in a suitable base member 17, whereby the instrument may be conveniently supported for use. Detachably connected with the forward end of said casing 11 is a front cap 18 having an internally threaded central opening to receive in axial connection therewith a cylindrical barrel 19 of reduced diameter provided with an apertured closed inner end. Connected with the free end of said barrel 19, so as to slide telescopically therein, is an eye-piece barrel 20 having a suitable lens 21 fixed therein, and being provided at its outer end with an apertured end member 22.

Arranged within said casing 11 forward of the lamp 15 is a transverse plate 23 provided with a central opening 24. Affixed to the rearward side of said plate 23 so as to bound the lower half of said opening 24 is a socket-member 25. This socket-member 25 serves to receive and detachably support across the opening 24 a suitable target element 26. Affixed to the forward side of said plate 23, below the opening 24 is a suitably shaped supporting bracket 27, which is vertically aligned beneath an entrance opening 28 provided in the upper side wall of said casing 11. A transparent test tube 29, containing the fluid to be examined, may be inserted through the entrance opening 28 so as to be supported by said bracket 27 across the plate opening 24 and in front of the target element 26.

Also arranged within said casing 11 and forwardly spaced from the plate 23 is a second transverse plate 30 having a central aperture in which is mounted a lens frame 31 having a suitable lens 32. Secured in proper location on the front face of said plate 30 are laterally spaced vertical guideway members 33 adapted to slidably receive and support a suitable wedge criteria means, one of said guideway members 33 having connected therewith a leaf-spring 34 to frictionally engage the inserted wedge criteria means so as to hold the same in any desired adjusted position. The top and bottom sides of the casing 11 are provided with openings 35 aligned with the thus formed guideway so that a wedge means may be both entered and manipulated in said guideway.

Also arranged within said casing 11 in advance of the plate 30 is a third transverse plate 36 which is provided with a central aperture 37, said plate serving to mount at one side thereof a color screen interposing means, and also at the other side thereof means to selectively provide a comparison field in juxtaposition to the subject field of examination, all of which will be hereafter described.

Said supporting plates 23, 30 and 36 are of reduced diameter relative to the interior diameter of said casing 11, so as to provide light transmission spaces S intermediate their peripheries and the walls of said casing. The interior side and end wall surfaces of the casing 11 are suitably treated to render the same light reflective, so that light of the lamp 15 may be reflected through the spaces S to the forward part of the casing interior. The forward face of the plate 36 around the marginal portions bordering the aperture 37, (which defines the field of examination or subject field), is suitably treated to furnish a light reflective zone whereby is furnished an adaptation field A in juxtaposition with the field of examination or subject field.

To provide a convenient means for mounting the plates 23, 30 and 36 in properly spaced relation, both with respect to each other and with respect to the casing sides, and so that the same, together with the parts mounted thereon, may be withdrawn from the casing 11 upon removal of the front cap 18, carrier rods 38 are secured to the front wall of said front cap 18 to extend rearwardly through the casing 11. Said plates 23, 30 and 36 are mounted on said carrier rods and are retained in desired spaced relation by intermediate spacing sleeves 39 which are arranged upon said rods. The assembly thus furnished is secured together by nuts 40, or any other suitable fastening means.

The wedge criteria means in preferred form comprises a measuring wedge panel A possessing a linear slope from end to end and a measuring wedge panel B also possessing a linear slope from end to end. Said wedge panels are arranged side by side, and preferably with their tapers running respectively in opposite directions. Said wedge panels are mounted in a carrying frame 41 which is provided intermediate the wedge panels with a suitably calibrated scale 42, the sides of the frame carrying the scale numerals for each adjacent wedge panel, and properly corresponding to the calibrated scale 42. Fixed on said casing 11, so as to cooperate with the calibrated scale 42 when the wedge criteria means is in use, is an indicator finger 43 in connection with which said scale may be read. The wedge panels A and B are respectively of different characteristics; e. g., the wedge panel A is a turbid wedge, that is it provides a transluscent body of progressively increasing density from its thin end toward its thick end, and may be produced from a callodion material treated with a white pigment, the density of distribution of which is progressively increased from one end to the other, so that it operates to increasingly scatter light transmitted therethrough as portions of increasing density are passed across the path of light until a target image viewed therethrough is obscured; the wedge panel B is an absorptive body, that is it provides a body of increasing opacity from its thin end toward its thick end, and may be produced by a photographic solution or emulsion of silver, so that it operates to increasingly absorb light transmitted therethrough as portions of increasing capacity are passed across the path of light until a target image viewed therethrough is obscured. The wedge panels A and B are subject to selective use in the instrument, and to this end the guideway therefor supported from the plate 30 is offset relative to the light transmission aperture of the latter, so that when the wedge device is inserted by one end with the panel A to the left, the same will be movable across said aperture, but when the wedge device is reversed end for end and inserted the panel B will be positioned to the left so as to be movable across said aperture, all of which will be clearly evident from an inspection of Figures 2 and 5 of the accompanying drawings.

Movable on the rear face of the plate 36 across the aperture 37 is a color screen interposing means comprising a fan-shaped plate 44 pivoted on one of said carrier rods 38. Said plate 44 is provided with a series of apertures 45 selectively registrable with the aperture 37. Secured by clips or other suitable retaining means 46 across certain apertures 45 are color screens, viz, a blue screen 47, a green screen 48 and a red screen 49. Associated with one aperture 45 is a spring retaining clip 50, by means of which a dismountable color screen of any desired color or tint may be mounted on the plate 44. One aperture 45 is left open so that it may be registered with the aperture 37 when it is not desired to interpose color screens in the field of examination. The plate 44 is provided with an exteriorly projecting finger-piece or handle 51 for manipulating the plate to selectively interpose or remove the color screens from the field of examination. In order to retain the plate 44 in any desired selected position, the back of the same is provided with a series of indentations 52 engageable with a spring pressed yieldable detent or stop pin 53 which is secured to the front face of the plate and extends operatively therethrough into cooperation with said indented face of said plate 44.

In order to provide, when it may be so desired, a comparison field in juxtaposition with the subject field of examination, the following means is furnished. Transversely and diametrically movable in guides 54' across the front of the plate 36 and in line with the aperture 37 is a frame member 54 upon which is mounted a Fresnel rhomboid prism 55. Extending between the plates 23 and 36 and through the plate 30 is a tubular element 56 to provide an enclosed longitudinal light passage, said plates 23 and 36 having apertures aligned with the said passage. The Fresnel rhomboid prism 55 is so arranged that on outward movement of the supporting frame member 54, the undercut end of said prism is opposed to the light passage of the element 56 while the opposite outwardly faced chamfered end of said prism is disposed half way across or so as to diametrically intersect the subject field aperture 37 of said plate 36. When the prism is in use direct light from the lamp 15 or other source which passes through the element 56 is transmitted longitudinally through the prism and deflected by the outwardly faced chamfered end of the same to the eye of the observer thus providing a comparison field of fixed characteristic in juxtaposition to the subject field provided by the remaining uncovered portion of said aperture 37, as will be clearly understood. When the prism is not in use the frame member 54 is moved inwardly to remove the respective ends of the prism from operative relation to the light transmission element 56 and the aperture 37; and to permit the necessary manipulation of said frame-member 54, the same is provided with a finger piece 57 at its exteriorly projecting end. Any suitable means for stopping the frame member to selectively locate the prism in either active or inactive position may be provided; as shown in the drawings the stop means may comprise slot 58 through which a carrier rod 38 extends, the respective ends of the slot properly limiting the movement of the frame member in each direction. It may be desirable at times to modify the color of the comparison field provided by the above described means, and to this end I have provided a vertical slideway 59 on the front side of the plate 23 and in cooperating relation to the light passage of the element 56. Suitably disposed in this slideway is a frame 60 in which are fixed a plurality of color screens 61 of different colors, which by movement of the frame 60 may be selectively disposed across the light passage to modify the light transmitted to and through the prism 55 to thereby give a desired color to the comparison field produced by the latter.

When operating the instrument to measure a fluid under examination by extinction index criteria, a suitable target 26 is engaged in the socket 25. This target may be of a transparent glass body silvered or otherwise treated to provide a central opaque zone 62 in which is formed a transparent target mark 63. Adjacent to the said target mark 63 within the opaque field are transparent comparison panels 64.

Other forms of targets, such as described in my heretofore mentioned copending patent applications may be employed if desired.

When the target is in place, the test-tube 29 is supplied with the fluid to be examined, and then inserted to dispose the same across the path of vision and in front of the target. The light of the lamp 15 being available is transmitted through the target mark to the eye piece of the instrument so as to be visible in the central field of examination or subject field. The operator now inserts the wedge to utilize either the turbid wedge A or absorptive wedge B as may be desired. The wedge is interposed between the fluid under examination and the eye-piece, and is manipulated by the operator until a wedge density is reached which obscures the target mark viewed through the wedge and fluid, at which point the wedge reading is taken. In order to assure acuity of vision within the subject field, and to make the end or vanishing point more critical and comfortable, a portion of the light from the source (viz lamp 15) is permitted by reflection to by-pass the plates 23, 30 and 36 through the annular spaces S and to be reflected upon the adaptation field A to be thence reflected to the eye of the observer, thus obviating the end or vanishing point taking place in darkness, and thus rendering its observation more critical and comfortable and free from optical operations. This feature of the instant invention with reference to the means and manner of attaining the result, is an important factor in the instrument of this invention, and makes possible the attainment of accurate measurements under conditions best adapted to assure undisturbed normal vision on the part of the operator when making examinations by extinction criteria methods. By manipulating the color screen device, colors adapted to the measurement of color of the fluid examined may be utilized. In general the methods of measurement adapted to be practiced by the instant device are such as have heretofore been described in detail in my aforementioned copending patent applications.

When making examinations by photometric criteria the Fresnel rhomboid prism is brought into operative position so as to provide adjacent to the subject field of examination, through which light traversing the fluid examined is transmitted, an independently illuminated and modified comparison field, this method being particularly described in my copending application Ser. No. 177,819, filed March 23, 1927.

Referring now to Figure 10 I have shown therein a hollow transparent wedge-shaped receptacle 65 open at its upper large end and mounted in a suitable frame 66. This wedge-shaped receptacle may be filled with the fluid to be examined, and is adapted to provide a progressively varied thickness of fluid mass from end to end of the receptacle. When using this device, the receptacle 29 and the measuring wedge means A—B are removed from the instrument, and the fluid filled wedge-shaped receptacle 65 is inserted in the wedge slideway 33. The target is then viewed directly through the contained fluid, the receptacle 65 being moved until a sufficient thickness of fluid mass is interposed to obscure the target mark, at which point a scale on the receptacle frame 66 may be read for measuring data. This is an additional novel direct method of measurement capable of being practiced with the instant instrument, and will be found frequently useful in obtaining comparison data, etc.

From the above it will be apparent that I have provided a simple form of instrument capable of use in attaining various measurements by several different methods, which measurements may correlate to determine desired characteristics of the fluid examined.

Having thus described my present invention, I claim:—

1. An instrument of the kind described, comprising a casing, means to close the forward end of said casing, said means having an eye aperture, means to provide a light source at the rearward end of said casing, a target member, means to mount said target member within said casing intermediate said eye aperture and said light source, a measuring wedge means movable through said casing intermediate said eye aperture and target, a transparent fluid receptacle, means to support said receptacle within said casing intermediate said wedge and said target, and an adjustable color screen carrying means to selectively interpose desired modifying colors across the subject field of examination.

2. An instrument of the kind described, comprising a casing the interior surfaces of which are light reflective, means to close the forward end of said casing, said means having an axial eye-piece, means to provide a light source at the rearward end of said casing, a plurality of longitudinally spaced centrally apertured transverse supporting plates within said casing of less diameter than the interior diameter of said casing to provide spaces for passing reflected light, the rearward plate having at its rear face a target receiving socket, a target device supported by said socket across the aperture of said rearward plate, said rearward plate having at its front face a fluid receptacle support, a transparent fluid receptacle engaged in said support to extend across the aperture of said rearward plate, a calibrated measuring wedge means, one of said remaining supporting plates having a slideway to receive and guide the movement of said wedge means across the aperture thereof, said casing having openings in its walls to pass said wedge means, a fixed indicator finger exteriorly mounted on said casing to cooperate with said calibrated wedge means, and an adjustable color screen carrying means associated with the other of said remaining supporting plates to selectively position across its aperture desired modifying color screens, said latter plate having on its forward face concentric to its aperture a light reflecting zone forming an adaption field illuminated by reflected light.

3. An instrument of the kind described, comprising a casing the interior surfaces of which are light reflective, means to close the forward end of said casing, said means having an axial eye-piece, means to provide a light source at the rearward end of said casing, a plurality of longitudinally spaced centrally apertured transverse supporting plates within said casing of less diameter than the interior diameter of said casing to provide spaces for passing reflected light, the rearward plate having at its rear face a target receiving socket, a target device supported by said socket across the aperture of said rearward plate, said rearward plate having at its front face a fluid receptacle support, a transparent fluid receptacle engaged in said support to extend across the aperture of said rearward plate, a calibrated measuring wedge means, one of said remaining supporting plates having a slideway to receive and guide the movement of said wedge means across the aperture thereof, said casing having openings in its walls to pass said wedge means, a fixed indicator finger exteriorly mounted on said casing to cooperate with said calibrated wedge means, said latter plate having on its forward face concentric to its aperture a light reflecting zone forming an adaption field illuminated in reflected light.

4. An instrument as defined in claim 2, in which the color screen carrying means comprises a pivoted screen plate having a series of apertures movable into registration with the aperture of the adjacent supporting plate, a series of transparent screens of respectively different colors fixed across certain of the apertures of said screen plate, said screen plate having a spring retaining clip cooperating with a normally open aperture of said screen plate to interchangeably engage thereon detachable color screens, said screen plate having an exteriorly projecting finger-piece for manipulating the same, and means for yieldingly holding said screen plate in desired adjusted position.

5. An instrument of the kind described, comprising a casing having spaced apart transverse centrally apertured supporting plates within the same, means to close the forward end of said casing having an eye-piece aligned with said centrally apertured supporting plates, means to provide a light source at the opposite end of said casing, a measuring wedge means, means connected with a supporting plate for slidably mounting said wedge across the aperture thereof, means for supporting a fluid receptacle intermediate said wedge device and said light source, means to provide an independent light passage through said supporting plates, a Fresnel rhomboid prism, a carrying frame for said prism, and means connected with the foremost supporting plate for adjustably supporting said prism and its frame whereby the former may be operatively positioned relative to said independent light passage and so as to intersect the field of vision through the aperture of said supporting plate for the purposes described.

6. An instrument as defined in claim 5, having means to selectively interpose light modifying color screens across said independent light passage.

7. An instrument as defined in claim 5, having a color screen carrying means adjustably movable across the aperture of said foremost supporting plate to selectively position across the field of vision therethrough desired light modifying color screens.

8. An instrument as defined in claim 5, having a color screen carrying means adjustably movable across the aperture of said foremost supporting plate to selectively position across the field of vision therethrough desired light modifying color screens, and being further provided with means to selectively interpose light modifying color screens across said independent light passage.

9. An instrument of the kind described, comprising a closed casing the interior walls of which are adapted to reflect light, a light source at the rear end of said casing, an axial eye-piece at the forward end of said casing, a target member intermediate said light source and eye-piece, means for measuring a fluid interposed between said eye-piece and target member, apertured means having their apertures aligned with said eye-piece to determine a field of examination, certain of said apertured means carrying supports for said target member and said measuring means, said apertured means being spaced from the walls of said casing to admit forward passage of reflected light, and the foremost apertured means having at its forward face and concentric to its aperture a light reflecting zone forming an adaptation field in juxtaposition to said field of examination, said adaptation field being illuminated by reflected light.

In testimony that I claim the invention set forth above I have hereunto set my hand this 15th day of August, 1927.

WILLIAM G. EXTON.